United States Patent [19]

Usamoto et al.

[11] 3,852,354

[45] Dec. 3, 1974

[54] HIGHER ALKYL THIUROM SULFIDE

[75] Inventors: Teruyoshi Usamoto, Osaka; Yasutaka Hatada, Higashi-Osaka; Itsuro Furuichi, Yoyonaka City; Masao Matsuo, Takatsuki, all of Japan

[73] Assignee: Sumitoma Chemical Company, Limited, Osaka, Japan

[22] Filed: Mar. 1, 1972

[21] Appl. No.: 230,957

Related U.S. Application Data

[63] Continuation-in-part of Ser. No. 70,934, Sept. 9, 1970, Pat. No. 3,706,819.

[52] U.S. Cl. ............ 260/567, 260/4 R, 260/23.7 M, 260/41.5 R, 260/79.5 B, 260/429 K, 260/889
[51] Int. Cl. ............................................ C07c 155/10
[58] Field of Search ...................... 260/567

[56] References Cited
UNITED STATES PATENTS
3,657,356   4/1972   Hudgins et al. ................. 260/567 X

FOREIGN PATENTS OR APPLICATIONS
4,215,783   8/1967   Japan

OTHER PUBLICATIONS

Fischer et al., Industrial and Engineering Chemistry, Vol. 51, No. 2, pp. 205–208, (Feb. 1959).

*Primary Examiner*—Leon Zitver
*Assistant Examiner*—Michael W. Glynn
*Attorney, Agent, or Firm*—James J. Long

[57] ABSTRACT

Blends of EPDM with highly unsaturated rubbers are co-cured with sulfur using as accelerators higher alkyl thiuram disulfides (e.g., tetralaurylthiuram disulfide) or benzothiazylsulfenamides (e.g., N-lauryl-benzothiazylsulfenamide).

1 Claim, No Drawings

HIGHER ALKYL THIUROM SULFIDE

This application is a continuation-in-part of our co-pending application Ser. No. 70,934, filed Sept. 9, 1970, now U.S. Pat. No. 3,706,819.

This invention relates to a co-vulcanizable composition comprising a blend of EPDM rubber and a highly unsaturated rubber. More particularly, the invention relates to such a co-vulcanizable blend of rubbers containing, as the accelerator, a compound which displays only a rather small difference in solubility in each of the rubbers.

Certain defects of highly unsaturated rubbers (such as natural rubber, styrene-butadiene rubber and polybutadiene rubber) such as a lack of ozone-resistance, weather-resistance and heat resistance can be compensated for by adding EPDM rubber, which has excellent properties in those respects. Unfortunately, the mechanical strength of the rubber blend, upon vulcanization, does not reach the arithmetic mean of the mechanical strengths of the component rubbers. This is a serious shortcoming in practical applications. The fact that the mechanical strength reaches the minimum when the ratio of EPDM and highly unsaturated rubber is in the neighborhood of 75/25 means that as a practical matter only small amount of EPDM may be mixed, thereby making it very difficult for example to improve the tackiness, adhesion and workability of EPDM by adding a small amount of a highly unsaturated rubber to EPDM. Therefore, it is an urgent task to provice mixtures of EPDM rubber and a highly unsaturated rubber such that mechanical strength of the mixture may be proportional to the arithmetic mean of the mechanical strengths of the component rubbers of mixture, at all mixing ratios.

The present inventors have studied in detail each factor which governs the co-vulcanization of the mixtures of EPDM and a highly unsaturated rubber in order to solve this problem. As a result, we attained new knowledge and developed the techniques of this invention which enables the co-vulcanization of the mixtures to be easily achieved.

With mixtures of EPDM and a highly unsaturated rubber compounded for sulfur vulcanization, the difficulty in attaining co-vulcanization of the mixtures has been explained as arising mainly from the considerable difference in the vulcanization velocities of EPDM and a highly unsaturated rubber. That is, as the vulcanization velocity of the former is extremely slow, compared with that of the latter, the vulcanization is not uniform between the different rubber phases of the vulcanized rubber mixture of EPDM and a highly unsaturated rubber, and the cross-linking between the different rubber phases is not sufficient, thereby reducing the rupture strength of the vulcanized rubber mixture to a great extent.

Actually, with a mixture of EPDM and styrene-butadiene rubber, use of organic peroxides for vulcanizing agents leads to a vulcanized rubber whose mechanical strength may be proportional to the arithmetic mean of those of the component rubbers of the mixture, and even if the vulcanizing agents are sulfur compounds, an increase of the degree of unsaturation of the EPDM to be mixed with the styrene-butadiene rubber results in improvement of the mechanical strength. Therefore, we may consider it an extremely important, necessary condition to increase considerably the vulcanization velocity of EPDM. If, however, we compare some rubber mixtures for sulfur vulcanization, for example, EPDM/styrene-butadiene rubber and EPDM/butyl rubber, we find that the tensile strength of the latter is proportional to the arithmetic mean of those of the components but this is not true with the former, although the difference of the vulcanization velocities may be extremely large with the latter, depending on the combination of rubbers to be mixed. This fact indicates that there exist important factors which govern the co-vulcanization of EPDM rubber blends, in addition to the difference in the vulcanization velocities of component rubbers.

The inventors have systematically measured the solubilities of various accelerators, including commercially available vulcanization accelerators, in EPDM and various rubbers, and have studied the relationships between the solubility and the co-vulcanizability of various EPDM mixtures to which the vulcanization accelerators used in the measurement were added. As a result, we found, surprisingly, that there exists an interrelation between solubility and co-vulcanizability. Firstly, we found that a vulcanization accelerator exhibits considerably different solubility in each rubber, and, therefore, the vulcanization accelerator is distributed in different concentration in each rubber phase of the mixture. Even if a vulcanization accelerator is blended with each rubber at the same concentration prior to blending the rubbers, the vulcanization accelerator easily shifts around in the blend due to diffusion of molecules, finally being re-distributed in accordance with the ratio of the solubilities. Secondly, since the difference in the solubility varies greatly depending on the type of vulcanization accelerator, a vulcanization accelerator which has solubilities resembling more closely those of EPDM and a highly unsaturated rubber to be mixed with the former leads to a better co-vulcanization of the mixture of the EPDM and the highly unsaturated rubber. Finally, we found that the replacement of methyl, cyclohexyl groups, etc. of tetramethyl thiuram monosulfide and N-cyclohexyl benzothiazyl sulfenamide by alkyl groups of higher numbers of carbon atoms brings the solubilities of the vulcanization accelerators in EPDM and a highly unsaturated rubber closer together, and that use of the said vulcanization accelerators leads to a considerable improvement of the co-vulcanization of the mixtures of EPDM and a highly unsaturated rubber.

According to the study of the present inventors, most of the conventional, commercially available vulcanization accelerators including those which slightly improve the co-vulcanizability, such as N-cyclohexyl benzothiazyl sulfenamide and N-oxydiethylene benzothiazyl sulfenamide, exhibit solubilities in highly unsaturated rubbers several times higher than in EPDM. Especially with vulcanization accelerators of the thiuram and dithioate groups, the solubilities in highly unsaturated rubbers become more than 10 times as large as those in EPDM, and those vulcanization accelerators are very easily dissolved in highly unsaturated rubbers. In addition, we found that the co-vulcanizability of a mixture of EPDM and a highly unsaturated rubber to which a vulcanization accelerator of the thiuram or dithionate group is added is considerably inferior to that of the same rubber to which a vulcanization accelerator of the sulfenamide group is added. Although N-cyclohexyl benzothiazyl sulfenamide and N- oxydiethylene benzothiazyl sulfenamide are vulcanization accelerators which show a smaller difference in solubilities in EPDM and a highly unsaturated rubber, and rubber mixtures of EPDM and a highly unsaturated rubber to which the said vulcanization accelerators are added exhibit a fairly improved co-vulcanization effect compared with the same mixtures to which other commercially available vulcanization accelerators are added, this is not sufficient and with some mixing ratios it is completely impractical.

As indicated in the detailed study of the inventors, success or failure of co-vulcanization of a mixture of EPDM and a highly unsaturated rubber with sulfur vulcanization agents depends on the solubilities of a vulcanization accelerator (to be blended with the mixture) in the EPDM and the highly unsaturated rubber. That is, the most important necessary condition for co-vulcanizability is that the solubilities of the vulcanization accelerator in both rubbers should be as close as possible to each other. Commercially available vulcanization accelerators, however, do not necessarily satisfy this necessary condition. A group of vulcanization accelerators has been found by the present inventors which satisfy the necessary condition, and this group shows an amazing co-vulcanization effect when blended with a mixture of EPDM and a highly unsaturated rubber.

The vulcanization accelerators to be used in the present invention are chemicals having the general formula (1) or (2) or mixtures thereof. The mixing ration may be appropriately chosen depending on the desired properties of a vulcanized rubber.

(1) 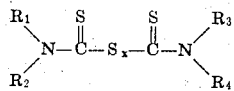

(where $R_1$, $R_2$, $R_3$ and $R_4$ are the same or different and are alkyl groups having together a total of at least 26, preferably 30, carbon atoms; preferably at least two of the R's have 12 to 18 carbon atoms; in some cases all of the R's have 12 to 18 carbon atoms; x represents an integer of 1 to 4).

(2) 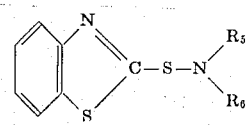

(where $R_5$ represents a hydrogen atom, an alkyl group [usually 1 to 6 carbon atoms], or a cyclohexyl group, and $R_6$ is an alkyl group of 12 to 18 carbon atoms).

All of the vulcanization accelerators of this invention have solubilities similar to EPDM and a highly unsaturated rubber, and the solubility in a highly unsaturated rubber is less than approximately 3 times that in EPDM (preferably less than twice).

Therefore, when the said vulcanization accelerators are blended with a mixture of EPDM and a highly unsaturated rubber, they will be uniformly dissolved or dispersed. The solubility here means the saturation solubility of a vulcanization accelerator in a solvent which has the same solubility parameter as EPDM or a highly unsaturated rubber. Methyl cyclohexane and carbon terachloride may be used as equivalent solvents for EPDM and SBR respectively. The value obtained by dividing the solubility in carbon tetrachloride by that in methyl cyclohexane is called the solubility ratio.

The number of carbon atoms in the substituents of the vulcanization accelerators are very important for the following reasons. On the one hand, a larger number of carbon atoms in the alkyl groups leads to an increase in the affinity for EPDM, consequently an increase in the solubility. On the other hand, an increase of the number of carbon atoms results in an increase of the molecular weight per radical and hence a larger amount of the chemical must be used, thereby increasing the cost.

On the other hand, if the number of carbon atoms is small, the solubility ratio becomes large, leading to degradation of the properties of the vulcanized mixture. Therefore, the number of carbon atoms in the alkyl substituents of the vulcanization accelerators should preferably be 12 to 18 for the accelerators having general formulae (1) and (2).

The EPDMs which may be employed in this invention, are terpolymers consisting of ethylene, propylene and non-conjugated diene. The range of the ethylene/propylene ratio is 20/80 to 80/20, by weight, while the non-conjugated diene content ranges from 2 to 20 percent by weight. Examples of the non-conjugated dienes are 1,4-hexadiene, dicyclopentadiene, 5-methylene-2-norbornene, 5-ethylidene-2-norbornene, and 4,7,8,9-tetrahydroindene.

Examples of highly unsaturated rubbers which may be used in the present invention, are conventional, commercially available natural rubbers, polyisoprene, rubber, styrene-butadiene rubber, styrene-acrylonitrile rubber, polybutadiene rubber, polychloroprene rubber, etc. Those rubbers may be used alone or in a combination for blending with EPDM. They are conjugated di-olefin polymers, whether homopolymers or copolymers with up to 50 percent of a copolymerizable monoethylenically unsaturated monomer (e.g., styrene, acrylonitrile, vinyl pyridine, ethyl acrylate, methyl methacrylate, etc.). Mixtures to be used in this invention should have the following compositions for effective results: EPDM, 85 to 25 weight-percent, and highly unsaturated rubber, 15 to 75 weight-percent.

Other than the accelerator, there is no special restriction on compounding ingredients such as sulfur, auxiliary agents and reinforcing fillers. Plasticizers, fire retarding agents, pigments, etc. may be also blended, if desired.

Ordinary mixing rollers, and mixers may be employed for preparing the rubber compositions of this invention. The compositions may be mixed and blended by ordinary mixing methods and under ordinary mixing conditions. The co-vulcanized rubber products obtained from the rubber compositions of the present invention are useful in various fields such as automobiles, vehicle parts, industrial parts, electric parts, and building materials, because of their excellent mechanical properties as well as their excellent ozone, weather, heat, and, chemical resisting properties and excellent electrical properties. Especially, the rubber compositions of the present invention will be very useful for developing the application of co-vulcanized rubbers containing EPDM of more than 40 weight percent.

White sidewalls or cover strips for pneumatic tires, made of the composition of the invention, are ozone-resistant and display good adhesion to a tire carcass made of highly unsaturated rubber.

In the following we shall explain this invention referring to Examples, but it should not be considered that this invention is restricted to those examples only.

EXAMPLE 1

Two kinds of mixtures as shown in the following table are prepared. Both mixtures are blended together at an arbitrary weight ratio. Let us call the weight ratio (EPDM mixture/SBR mixture) as blending ratio. The EPDM may be ethylene-propylene-5-ethylidene-2-norbornene terpolymer containing 43 percent propylene by weight, iodine number 20.

|  | EPDM Mixture | SBR Mixture |
|---|---|---|
| EPDM produced by U.S. Uniroyal | 100 parts |  |
| SBR produced by Nippon Synthetic Rubber Co. JSR 1500 |  | 100 parts |
| HAF Black | 50 parts | 50 parts |
| Process oil | 15 parts | 15 parts |
| Zinc white | 5 parts | 5 parts |
| Stearic acid | 1 part | 1 part |
| Sulfur | 1.5 part | 1.5 part |
| Vulcanization accelerator | 0.0076 mole | 0.0076 mole |

An EPDM mixture and a SBR mixture to which one adds tetralauryl thiuram disulfide (a vulcanization accelerator of thiuram group), having the following structural formula, are prepared. Both mixtures are blended with various weight ratios.

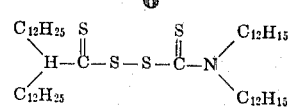

Then, the blended rubbers are press-vulcanized for 30 minutes at 150°C. under a pressure of 50 Kg/cm². The tension test of the vulcanized products is carried out in accordance with JISK 6301: specimens of No. 3 dumbbell shape of 2 mm thick are stretched at a stretching speed of 500 mm/min by means of a Shopper type tension tester manufactured by Shimazu Seisakusho Co., Ltd. The results are shown in the following table together with the results for tetramethyl thiuram monosulfide (TS) which are a widely used thiuram group vulcanization accelerator and those for tetrabutyl thiuram disulfide (TBT) which has the longest linear chain hydrocarbon radicals among the commercially available thiuram group vulcanization accelerators.

| Accelerator: | Blending Ratio Solubility-Ratio | Tensile Strength (Kg/cm²) 100/0 | 75/25 | 50/50 | 25/75 | 0/100 |
|---|---|---|---|---|---|---|
| Tetralauryl Thiruam disulfide | 2 | 196 | 165 | 168 | 177 | 202 |
| TS (control) | 57 | 190 | 35 | 76 | 122 | 166 |
| TBT (control) | — | 193 | 87 | 95 | 140 | 185 |

The tensile strength of the vulcanized rubber mixtures to which the vulcanization accelerator of improved solubility is mixed, is very large, clearly indicating the improvement.

EXAMPLE 2

The following types of EPDM's which contain a third component are used, and the same operations and test are carried out. The following tables give the results.

Blending and vulcanization of EPDM produced by U.S. Uniroyal (ethylene/propylene weight ratio 65/35, 5 percent by weight of dicyclopentadiene) and JSR 1500, SBR produced by Nippon Synthetic Rubber CO., Ltd.

| Accelerator: | Blending ratio Solubility Ratio | Tensile Strength (Kg/cm²) 100/0 | 75/25 | 50/50 | 25/75 | 0/100 |
|---|---|---|---|---|---|---|
| Accelerator used in this Example | 2 | 196 | 97 | 123 | 167 | 202 |
| TS (control) | 57 | 201 | 35 | 77 | 126 | 166 |
| TBT (control) | — | 210 | 45 | 88 | 147 | 185 |

Blending and vulcanization of Nordel 1040, EPDM produced by the U.S. du Pont Co. (the third component is 1,4-hexadiene) and JSR 1500, SBR produced by Nippon Synthetic Rubber Co., Ltd.

| Accelerator: | Blending ratio Solubility Ratio | Tensile Strength (Kg/cm²) 100/0 | 75/25 | 50/50 | 25/75 | 0/100 |
|---|---|---|---|---|---|---|
| Accelerator used in this Example | 2 | 191 | 110 | 131 | 170 | 202 |
| TS (control) | 57 | 198 | 37 | 75 | 130 | 166 |
| TBT (control) | — | 195 | 56 | 90 | 150 | 185 |

EXAMPLE 3

N-lauryl benzothiazyl sulfenamide having the following structural formula is blended, followed by the same operations and test as in Example 1. The tensile strength of the mixtures after vulcanization is shown in the following table.

[Structural formula: benzothiazole ring with C—S—N(H)—C$_{12}$H$_{25}$]

| Accelerator: | Blending ratio Solubility Ratio | Tensile Strength (Kg/cm$^2$) 100/0 | 75/25 | 50/50 | 25/75 | 0/100 |
|---|---|---|---|---|---|---|
| Accelerator used in this Example | Less than 2 | 195 | 184 | 186 | 190 | 210 |
| CZ(control) | More than 4 | 198 | 123 | 124 | 175 | 228 |

Comparison with N-cyclohexyl benzothiazyl sulfenamide (CZ) which is known to be very suitable for vulcanization of a mixture shows that the vulcanization accelerator of this invention has a superior property.

The foregoing examples may be repeated, using such accelerators as N,N'-di-n-propyl-N,N'-ditetradecyl thiuram disulfide, tetrastearyl thiuram monosulfide, N,N'-diisopropyl-N,N'-didodecyl thiuram mono-, or disulfide, N,N'-diisopropyl-N,N'-dioctadecyl thiruam di- or tri-sulfide, N,N'-diisobutyl-N,N'-dioctadecyl thiruam disulfide, tetralauryl thiuram mono-, di-, tri-, or tetra-sulfide, tetrapentyl thiuram disulfide, N-methyl-N-dodecyl benzothiazyl sulfenamide, N-dodecyl benzothiazyl sulfenamide, N-cyclohexyl-N-hexadecyl benzothiazyl sulfenamide, N-hexyl-N-octadecyl benzothiazyl sulfenamide, N-isopropyl-N-dodecyl benzothiazyl sulfenamide, etc. The accelerators of formulas (1) and (2) are new chemicals.

Examples of preparations of the chemicals are as follows:

N-dodecyl-N-isopropyl-2-benzothiazole sulfenamide. Chlorine (14.2g) was added to a suspension of 68g of benzothiazoyl disulfide in 500 ml of ethylene dichloride. The resulting solution was added to a solution of 90.8g. of N-isopropyl-N-dodecylamine and 40.4g of triethylamine in 450 ml. of ethylene dichloride at 20°–25°C. over a one hour period. The reaction mixture was stirred for 15 minutes at which time the amine hydrochloride was removed by filtration. The solution was concentrated by removing solvent under vacuum and additional solid was removed by filtration. The product was obtained as a brown oil by evaporating the remaining solvent.

| | | |
|---|---|---|
| Anal. Calc. for C$_{22}$H$_{36}$N$_2$S$_2$: | N, 7.14; | S, 16.33 |
| Found | N, 6.70; | S, 16.26 |

N,N-'di-n-docecyl-N,N'-diisopropylthiuram disulfide.

A solution of 8g. of sodium hydroxide in 150 ml. of water was added to a solution of 45.4 g of N-isopropyl-N-dodecylamine in 100 ml. of ethanol. To the stirred mixture was added dropwise 16 g of carbon disulfide. A solid separated; 50 ml. ethanol was added to aid agitation. To this suspension at room temperature was added a solution prepared from 10 g. conc. sulfuric acid, 11.8 g. of 30 percent hydrogen peroxide and ice. The addition was carried out over a ½ hour period with cooling. The solid changed to a thick yellow oil. After stirring for ½ hour 100 ml. of water were added and the oil extracted into hexane. The hexane was removed in vacuo to give 60.6 g. of oil which solidified when cooled. The solid was recrystallized from ethanol to obtain 30 g. of colorless crystalline product mp 40°–41°C.

Anal Calcd. for C$_{32}$H$_{64}$N$_2$S$_4$: C, 63.58; H, 10.60; N, 4.63; S, 21.19. Found. C, 64.05; H, 10.80; N, 4.84; S, 21.66.

EXAMPLE 4

A masterbatch is mixed in a Banbury containing (by weight) 50 parts NBR (31 percent acrylonitrile), 50 parts EPDM (E/P ration 60/40; 10 percent ethylidene norbornene), 50 parts carbon black, 5 parts zinc oxide, and 0.75 part stearic acid. Three portions of the masterbatch (designated A, B and C) are mixed with 2.5 parts sulfur (phr) and approximately equimolar quantities of accelerator as follows: (mm per 100 g rubber)

| | A | B | C |
|---|---|---|---|
| tetramethyl thiuram disulfide | 4.17 | — | — |
| tetraethyl thiuram disulfide | — | 4.06 | — |
| N,N'-diisopropyl-N,N'-didodecyl thiuram disulfide | — | — | 3.97 |

All three stocks are cured for 10 minutes at 320°F. The physical properties are as follows:

| | A | B | C |
|---|---|---|---|
| Tensile strength, pai | 750 | 800 | 1680 |
| Elongation at break, % | 120 | 130 | 230 |
| Hardness, Shore A | 72 | 72 | 71 |

It will be seen that stock C of the invention containing, N,N'-isopropyl-N,N'-dodecyl thiuram disulfide as the accelerator produced a superior cure, compared to the prior art stocks A and B.

Another preferred accelerator, N,N'-diisobutyl-N,N'-dioctadecyl thiuram disulfide, may be substituted in Example 4 with expecially good results.

Having thus described our invention, what we claim and desire to protect by letters patent is:

1. A chemical which is N,N'-diisopropyl-N,N'-dioctadecyl thiuram disulfide.

\* \* \* \* \*